United States Patent [19]

Neder

[11] 4,026,614

[45] May 31, 9177

[54] ROLLING CONTACT BEARING ASSEMBLY

[75] Inventor: Günter Neder, Schweinfurt, Germany

[73] Assignee: SKF Industrial Trading and Development Company, B.V., Nieuwegein, Netherlands

[22] Filed: May 20, 1975

[21] Appl. No.: 579,269

[30] Foreign Application Priority Data

May 25, 1974 Germany .......................... 2425350

[52] U.S. Cl. ............................ 308/189 R; 308/18; 308/195; 308/207 A; 403/97; 403/370
[51] Int. Cl.² ................... F16C 13/00; F16C 33/00
[58] Field of Search ............. 308/187.1, 187.2, 18, 308/189 R, 195, 207 R, 207 A; 403/97, 368, 370

[56] References Cited

UNITED STATES PATENTS

| 2,723,138 | 11/1955 | Knudsen | 403/370 |
| 3,495,857 | 2/1970 | Hawke et al. | 403/97 |
| 3,953,142 | 4/1976 | Price et al. | 308/236 |

*Primary Examiner*—Joseph F. Peters, Jr.
*Assistant Examiner*—Richard A. Bertsch
*Attorney, Agent, or Firm*—Daniel M. Rosen

[57] ABSTRACT

A bearing assembly having a rolling contact bearing affixed to a housing, an outer race fixed to the housing and an inner race, wherein a driving member, the inner race and a driven member are clamped together by a through-bolt extending through the driving member, the inner bore of the inner race and the driven member. At least one end face of the inner race is provided with axially extending teeth. A stepped sleeve is placed between said one end face and the respective member at that one end face, the stepped sleeve having an axially extending projection and being deformable by engagement with the teeth for positive engagement therebetween. The respective member has a recess into which the projection extends, the stepped sleeve extending into and positively engaging the bore of the inner race.

9 Claims, 4 Drawing Figures

ROLLING CONTACT BEARING ASSEMBLY

THE INVENTION

The invention relates to rolling contact bearing assemblies, and more in particular to an arrangement for the supporting of drums for washing machines or the like by means of a rolling contact bearing whose inner race is provided with teeth on the face of at least one end for the positive locking, by means of a through-bolt, of the drum and/or belt pulley provided with flanges. It will be apparent, of course, that the assembly, in accordance with the invention, may be employed in other applications.

A drum bearing of this design with face teeth on both ends is disclosed in German Utility Model Pat. 7,205,917, and is illustrated in greater detail in FIG. 4 of this patent. This bearing unit requires less space than other units, especially in axial direction, and can be readily installed and dismantled. Owing to the use of teeth on both end faces of the inner race, a positive connection is provided by means of a through-bolt for the transfer of the torque from the pulley via the inner race of the bearing to the drum of the washing machine. In addition, the drum can, if need be, be readily dismantled by lifting, as a result of the untightening of the through-bolt connection, without any axial displacement of the bearing.

A prerequisite for the satisfactory operation of the arrangement of the bearing known in the art is that, upon installation, the face teeth at either end of the inner race must be in mating engagement. Any improper meshing — tooth against tooth — renders the machine inoperative. A factor rendering assembly more difficult is that the face teeth compressed out of solid material have comparatively dull tooth tips. Visual alignment of the components is not possible on account of the fact that the mounting position does not provide ready inspection to the mechanic.

It is the object of the present invention to provide an improved bearing unit for washing machine drums or the like, whereby, following assembly of the arrangement, the face teeth at either end of the inner race are at all times exactly mated.

In the arrangement of the type described above, this object is attained, in accordance with the inventon, by providing a stepped sleeve that can be forced on the drive and/or the driven end of the inner race onto the face teeth and that positively engages the borehole of the inner race. The sleeve is provided with projections or the like designed for positive engagement with the flange of the drum and/or the pulley.

Preferably, the stepped sleeve consists of a plastically deformable material, for instance sheet metal, and the sections of the sleeve axially engaging the inner race are forced with a bead into a corresponding annular groove of the borehole of the inner race.

The advantage of the invention consists, above all else, in that the bearing in the form of its basic design can be used without modifications for various applications. All that is necessary is to modify appropriately the stepped sleeves acting as adapters so as to correspond to the desire of the different manufacturers of washing machines or the like so as to conform the stepped sleeves to the differentially designed flanges of the drum and/or the pulley.

The invention is more clearly explained in the following paragraphs, with reference to an exemplified embodiment illustrated in the drawings.

IN THE DRAWINGS

Figure 1:
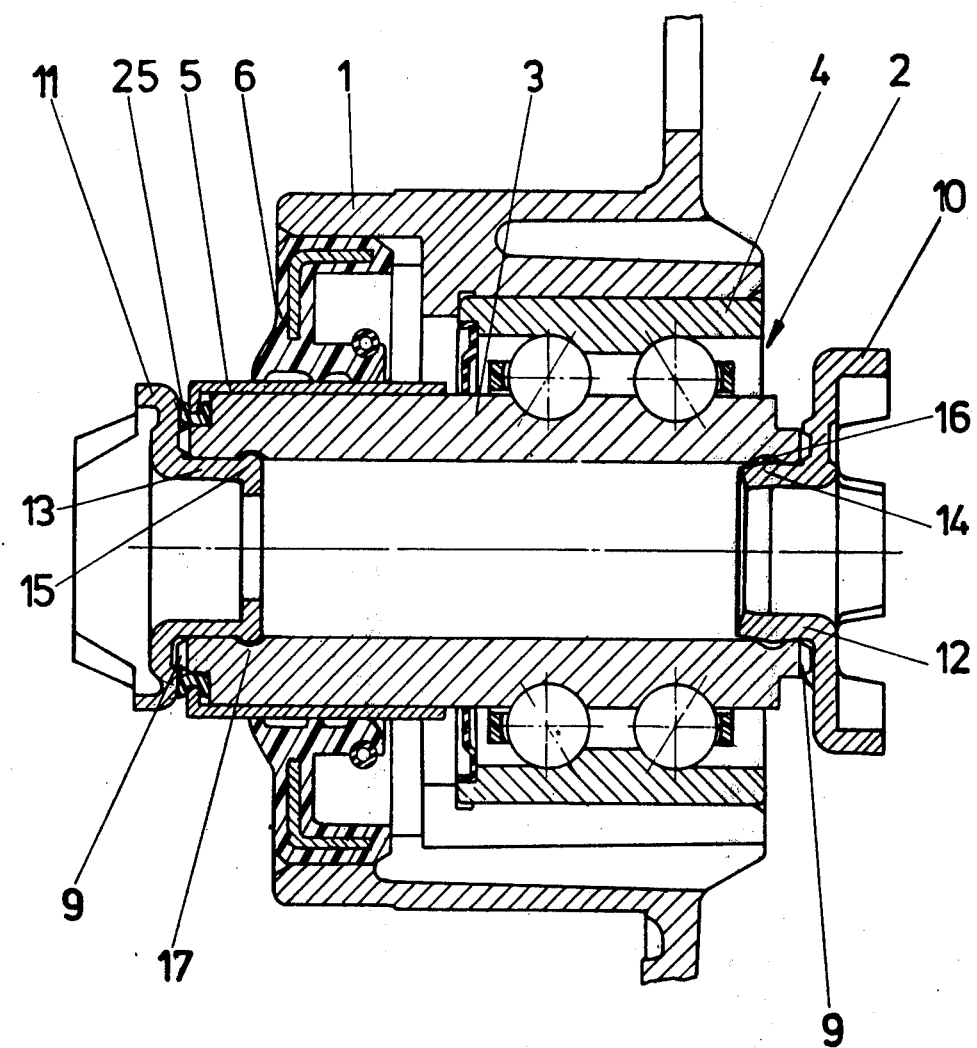
FIG. 1 is a cross-section through an arrangement of the bearing in accordance with the invention.
Figure 2:
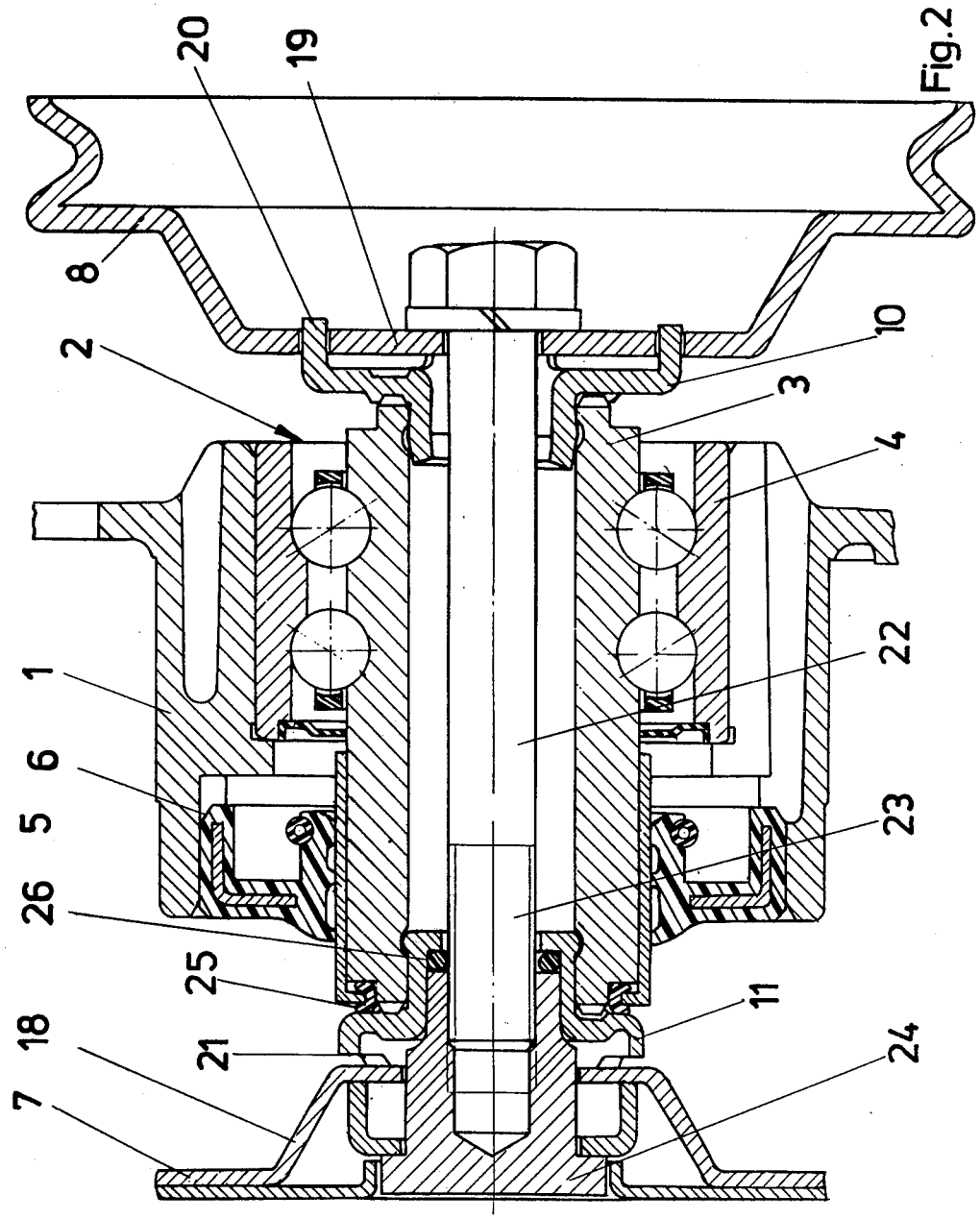
FIG. 2 shows the arrangement of the bearing of FIG. 1 assembled in a portion of a frame.

As illustrated in FIGS. 1 and 2, a housing 1 that can be flange-connected to a washing machine frame or the like accommodates a rolling contact bearing such as a two-row ball bearing 2 which, in addition to radial and axial forces, can also absorb torque stresses. The inner race 3 of the ball bearing 2 is substantially longer than the outer race 4 so that, in addition to a collar-bearing face 5 for a gasket 6, it still affords room for the attachment of the drum 7 and the pulley 8 (FIG. 2). For that purpose, the inner race 3 is provided on both ends with face teeth 9. Onto said teeth there has been forced, on the drive side, a stepped sleeve 10 and, on the driven side, a stepped sleeve 11 (FIG. 1). The relativey soft material of the stepped sleeves 10 and 11, which may be manufactured of sheet metal is, upon compression onto the face teeth 9, plastically set so that the hard teeth of the face teeth 9 dig into the sheet metal of the stepped sleeves 10 and 11. Simultaneously with the fitting of the stepped sleeves 10 and 11, their sections 12 and 13 engaging the inner race 3 are radially expanded so that the beads 14 and 15 become plastically set respectively in annular grooves 16 and 17 in the borehole of the inner race 3.

The bearing unit (FIG. 1) manufactured in this manner consists of a plurality of interconnected components that cannot become separated and lost. The flange 18 of the drum 7 and the flange 19 of the pulley 8 (FIG. 2) are now attached to the bearing. For that purpose, the flange 19 is mounted in such a way onto the stepped sleeve 10 that the axial projections of the sleeve engage corresponding recesses of the flange 19. The flange 18 whose recesses become engaged via corresponding projections 21 of the stepped sleeve 11 is mounted in a similar manner. The clamping of the flanges 18 and 19 with the inner race 3 is achieved by means of a through-bolt 22 inserted through the borehole of the inner race 3 and screwed by means of its threaded extremity 23 into a nut 24 that has been loosely inserted into the flange 18. Upon tightening of the through-bolt 22, the parts become twist-resistant and positively interconnected for the purpose of the transfer of the torque. The inserted elastic rings 25 and 26 become crushed in the process and act as an additional sealing against the penetration of detergent or the like into the bearing.

In the case of the exemplified embodiment there has been provided respectively one stepped sleeve at each extremity of the inner race, that is to say, on the driving as well as on the driven side. It is, however, readily possible to provide a stepped sleeve only at one extremity of the inner race while, on the other side, the connection with the connected element is effected by a different method, such as the method disclosed in the above German patent.

Figure 3:
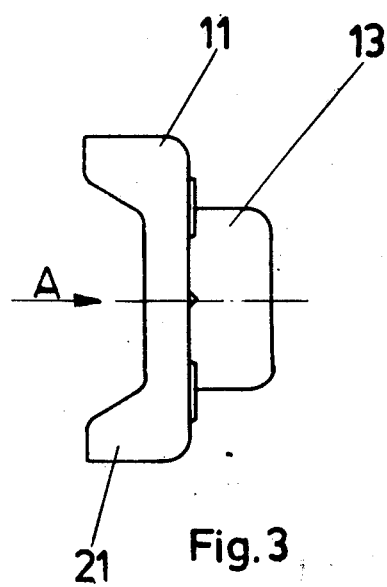
FIG. 3 shows the stepped sleeve on the driven side in a position rotated 90°.
Figure 4:
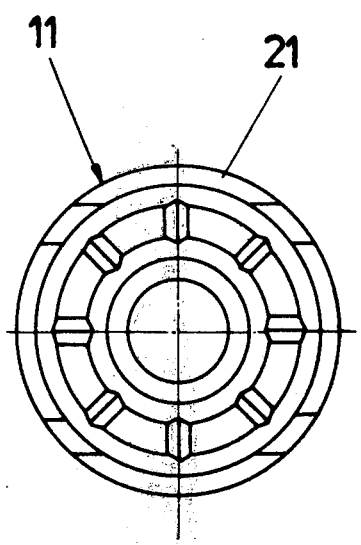
FIG. 4 represents a view of the stepped sleeve in the direction A of FIG. 3.

FIG. 3 is a side view of the stepped sleeve 10, while FIG. 4 is an end view of the stepped sleeve of FIG. 3 taken in the direction of the arrow A.

It will be understood of course, that while a single embodiment of the invention has been disclosed, modifications and variations may be made therein and it is intended in the following claims to cover each such variation and modification as falls within the true spirit and scope of the invention.

What is claimed is:

1. In a bearing assembly wherein a rolling contact bearing is affixed to a housing and has an outer race fixed to the housing and an inner race, wherein a driving member, the inner race and a driven member are clamped together by a through-bolt extending through the driving member, the inner bore of the inner race and the driven member; the improvement wherein at least one end face of said inner race is provided with axially extending teeth, and further comprising a stepped sleeve between said one end face and the respective member at said one end face said stepped sleeve being deformable by engagement with said teeth for positive engagement therebetween, and having axially extending projection means, the respective member having recess means into which said projection means extend, said stepped sleeve further extending into and positively engaging said bore of said inner race.

2. The bearing assembly of claim 1, wherein said stepped sleeve is a plastically deformable material softer than the material of said inner race.

3. The bearing assembly of claim 1, wherein said sleeve is a sheet metal sleeve.

4. The bearing assembly of claim 1, wherein said inner race has an annular groove in its inner bore, said stepped sleeve having a bead extending into and being plastically set in said annular groove.

5. The bearing assembly of claim 1, wherein said driving member comprises a pulley, and said driven member comprises a drum.

6. The bearing assembly of claim 1, wherein said rolling contact bearing comprises a two-row ball bearing.

7. The bearing assembly of claim 1, wherein the other end face of said inner race is also provided with axially extending teeth, and further comprising a second stepped sleeve engaging the teeth of said other end face, said second stepped sleeve having axially extending projections, the other of said member having recess means into which the projections of said second stepped sleeve axially extend, said second stepped sleeve extending into and positively engaging the bore of said inner race.

8. The bearing assembly of claim 1, wherein one of said driving and driven members have internal threads into which said through-bolt extends for positively clamping said driving member, stepped sleeve, inner race and driven member together.

9. In a bearing assembly comprising a rolling contact bearing having an inner race with an axially extending bore, an outer race radially outwardly and co-axial with said inner race, and a plurality of rolling elements between said inner and outer races, said inner race extending axially beyond said outer race at one end, the improvement wherein said one end of said inner race has axially extending teeth, and further comprising a stepped sleeve member having one end portion extending into and engaging said bore at said one end of said inner race, an intermediate radially extending portion joined to said one end portion and engaging said teeth, whereby relative rotation of said sleeve and inner race is inhibited and a second end portion extending axially from said intermediate portion and having axially extending steps, an annular groove in said bore, said one end portion of said sleeve extending into and being plastically set in said groove.

* * * * *

UNITED STATES PATENT AND TRADEMARK OFFICE
CERTIFICATE OF CORRECTION

PATENT NO. : 4,026,614
DATED : May 31, 1977
INVENTOR(S) : Gunter Neder

It is certified that error appears in the above-identified patent and that said Letters Patent are hereby corrected as shown below:

Change issue date from "May 31, 9177" to --May 31, 1977--.

Column 3, line 23, change "face said" to --face, said--.

Column 4, line 35, change "inhibited and" to --inhibited, and --.

Signed and Sealed this

Twenty-seventh Day of September

[SEAL]

Attest:

RUTH C. MASON
Attesting Officer

LUTRELLE F. PARKER
Acting Commissioner of Patents and Traden